(12) United States Patent
Rivera (10) Patent No.: US 9,293,825 B2
(45) Date of Patent: Mar. 22, 2016

(54) MULTI-LOOP ANTENNA SYSTEM FOR CONTACTLESS APPLICATIONS

(71) Applicant: VERIFONE, INC., San Jose, CA (US)

(72) Inventor: Marinel Salaver Rivera, Rocklin, CA (US)

(73) Assignee: VERIFONE, INC., San Jose, CA (US)

(*) Notice: Subject to any disclaimer, the term of this patent is extended or adjusted under 35 U.S.C. 154(b) by 403 days.

(21) Appl. No.: 13/837,365

(22) Filed: Mar. 15, 2013

(65) Prior Publication Data

US 2014/0266966 A1    Sep. 18, 2014

(51) Int. Cl.
| | |
|---|---|
| H01Q 7/00 | (2006.01) |
| H01Q 1/22 | (2006.01) |
| H01Q 5/50 | (2015.01) |
| H01Q 5/314 | (2015.01) |
| H01Q 1/38 | (2006.01) |
| H01Q 21/30 | (2006.01) |
| H01Q 23/00 | (2006.01) |
| G06K 7/10 | (2006.01) |

(52) U.S. Cl.
CPC .............. *H01Q 7/00* (2013.01); *G06K 7/10316* (2013.01); *H01Q 1/2216* (2013.01); *H01Q 1/38* (2013.01); *H01Q 5/314* (2015.01); *H01Q 5/50* (2015.01); *H01Q 7/005* (2013.01); *H01Q 21/30* (2013.01); *H01Q 23/00* (2013.01)

(58) Field of Classification Search
CPC ...... H01Q 7/00; H01Q 5/0024; H01Q 1/2208; H01Q 1/2216; H01Q 5/314; H01Q 5/50; G06K 7/10316
USPC .......................... 343/741, 742, 743, 744, 867
See application file for complete search history.

(56) References Cited

U.S. PATENT DOCUMENTS

| | | | | |
|---|---|---|---|---|
| 4,922,261 | A * | 5/1990 | O'Farrell | G06K 7/10336 340/572.7 |
| 5,508,710 | A * | 4/1996 | Wang | H01Q 7/00 343/726 |
| 5,602,556 | A * | 2/1997 | Bowers | H01Q 7/04 340/572.7 |
| 6,025,813 | A * | 2/2000 | Hately et al. | 343/867 |
| 6,300,914 | B1 * | 10/2001 | Yang | 343/741 |
| 6,906,672 | B1 * | 6/2005 | Miller et al. | 343/744 |
| 7,830,324 | B2 | 11/2010 | Eray | |
| 7,990,326 | B2 * | 8/2011 | Nakamura | H01Q 7/06 343/742 |
| 8,599,094 | B2 * | 12/2013 | Lee | H01Q 1/52 343/866 |

(Continued)

FOREIGN PATENT DOCUMENTS

| | | |
|---|---|---|
| JP | 2006-287659 A | 10/2006 |
| KR | 10-0867527 B1 | 11/2008 |

OTHER PUBLICATIONS

Communication dated Jun. 30, 2014, issued by the European Patent Office in counterpart European application No. 14151464.6.

(Continued)

*Primary Examiner* — Dameon E Levi
*Assistant Examiner* — Jennifer F Hu
(74) *Attorney, Agent, or Firm* — Sughrue Mion, PLLC (57) ABSTRACT

An antenna system suitable for use with contactless transaction devices, the antenna system including a reader, a primary loop antenna having a first end and a second end, each one of the first and second ends being coupled to the reader and at least one secondary loop antenna galvanically connected to the primary loop antenna at a single connection point and positioned with respect to the primary loop antenna so as to make capacitive coupling therebetween negligible.

17 Claims, 4 Drawing Sheets

(56) References Cited

U.S. PATENT DOCUMENTS

| | | | | |
|---|---|---|---|---|
| 8,749,390 B2* | 6/2014 | Eray | ............ | H01Q 7/00 340/572.5 |
| 9,033,250 B2* | 5/2015 | Finn | ............ | G06K 19/07769 235/492 |
| 2001/0011012 A1* | 8/2001 | Hino | ............ | H01Q 1/22 455/575.7 |
| 2004/0183742 A1* | 9/2004 | Goff et al. | ............ | 343/867 |
| 2005/0001779 A1* | 1/2005 | Copeland | ............ | G06K 7/10336 343/867 |
| 2008/0150693 A1* | 6/2008 | You et al. | ............ | 340/10.1 |
| 2009/0152362 A1* | 6/2009 | Ayala | ............ | H01Q 1/2225 235/492 |
| 2010/0117454 A1* | 5/2010 | Cook | ............ | G06K 7/0008 307/104 |
| 2011/0266883 A1 | 11/2011 | Eray | | |

OTHER PUBLICATIONS

AN678. RFID Coil Design, Microchip Technologies Inc., 1998.

* cited by examiner

MULTI-LOOP ANTENNA SYSTEM FOR CONTACTLESS APPLICATIONS

FIELD OF THE INVENTION

The present invention relates generally to antenna systems and more particularly to antenna systems for use in contactless applications.

BACKGROUND OF THE INVENTION

The following U.S. Patent Documents are believed to represent the current state of the art:
U.S. Pat. No. 7,830,324; and
U.S. Patent Application No. 2011/0266883.

SUMMARY OF THE INVENTION

The present invention seeks to provide an improved multi-loop antenna system for use in contactless applications.

There is thus provided in accordance with a preferred embodiment of the present invention an antenna system suitable for use with contactless transaction devices, the antenna system including a reader, a primary loop antenna having a first end and a second end, each one of the first and second ends being coupled to the reader and at least one secondary loop antenna galvanically connected to the primary loop antenna at a single connection point and positioned with respect to the primary loop antenna so as to make capacitive coupling therebetween negligible.

Preferably, the at least one secondary loop antenna includes a single secondary loop antenna.

Preferably, the first and second ends of the primary loop antenna are connected to a matching circuit, the matching circuit being operative to match an impedance of the primary loop antenna to an impedance of the reader.

In accordance with a preferred embodiment of the present invention, the primary loop antenna includes three turns.

Preferably, the secondary loop antenna includes three turns.

In accordance with another preferred embodiment of the present invention, the primary loop antenna has a resonant frequency of 13.56 MHz.

Preferably, the secondary loop antenna has a resonant frequency in a range of 12-20 MHz.

Preferably, the resonant frequency of the primary loop antenna is offset from the resonant frequency of the secondary loop antenna by at least 400 kHz.

Preferably, the secondary loop antenna includes a capacitor for tuning the secondary loop antenna.

Preferably, the connection point of the secondary loop antenna to the primary loop antenna includes a connection point of a first end of the secondary loop antenna to the reader.

Preferably, the secondary loop antenna includes a closed loop.

In accordance with a further preferred embodiment of the present invention, the primary loop antenna is separated from the secondary loop antenna by a distance of at least 1.5 mm.

Preferably, the secondary loop antenna is located within and enclosed by the primary loop antenna.

In accordance with yet another preferred embodiment of the present invention, the primary loop antenna and the secondary loop antenna are formed on a printed circuit board.

Preferably, the primary loop antenna is formed on an upper surface of the printed circuit board and the secondary loop antenna is formed on a lower surface of the printed circuit board.

Alternatively, the primary loop antenna and the secondary loop antenna are formed on a common surface of the printed circuit board.

Preferably, the primary loop antenna is coupled to the reader by way of a coaxial cable.

In accordance with yet a further preferred embodiment of the present invention, the contactless transaction device includes a near field communication device.

Preferably, the contactless transaction device includes a contactless credit card.

There is further provided in accordance with another preferred embodiment of the present invention an antenna system suitable for use with contactless transaction devices, the antenna system including a reader, a primary loop antenna coupled to the reader so as to present an inductive load to the reader and at least one secondary loop antenna galvanically connected to the primary loop antenna at a single connection point and coupled to the reader so as not to present an inductive load to the reader.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
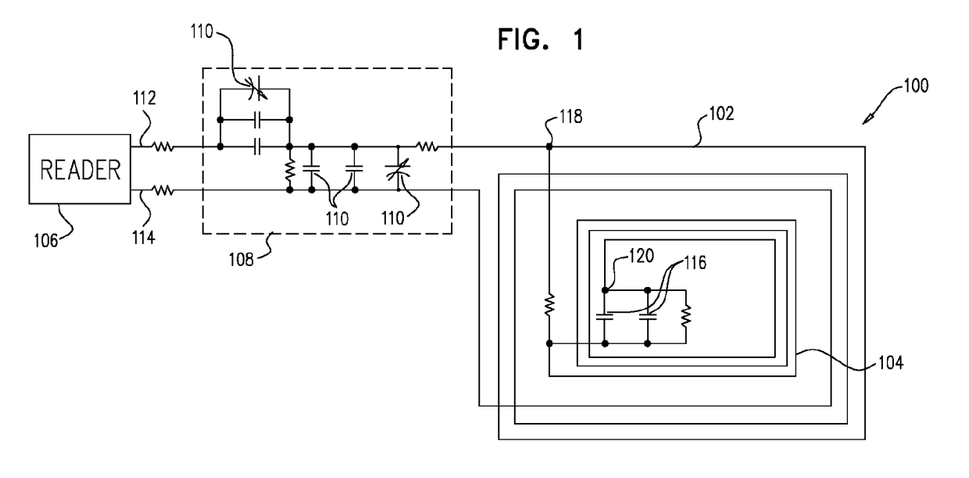
FIG. 1 is a simplified circuit diagram of an antenna system constructed and operative in accordance with a preferred embodiment of the present invention.

Reference is now made to FIG. 1, which is a simplified circuit diagram of an antenna system constructed and operative in accordance with a preferred embodiment of the present invention.

As seen in FIG. 1, there is provided an antenna system 100 preferably including a primary loop antenna 102 and at least one secondary loop antenna 104, here embodied, by way of example, as a single secondary loop antenna 104. Antenna system 100 further includes a reader 106, to which reader 106 primary and secondary loop antenna antennas 102 and 104 are preferably coupled.

Antenna system 100 is preferably adapted for use with contactless transaction devices. Particularly preferably, antenna system 100 is operative to meet EMVCo Contactless Level 1 Requirements at 13.56 MHz for communication with contactless credit cards when antenna system 100 is installed in a contactless transaction terminal such as a vending machine. It is appreciated that reader 106 may be any contactless reader operative to read contactless transaction devices, such readers being well known in the art.

The impedance of primary loop antenna 102 is preferably matched to the impedance of reader 106 by way of a matching circuit 108. For contactless credit card applications at 13.56 MHz, primary loop antenna 102 is preferably tuned together with matching circuit 108 to resonate at 13.56 MHz at a 50 Ohm impedance. It is appreciated, however, that primary loop antenna 102 may be matched to reader 106 at a variety of operating frequencies and input impedances, depending on the operating requirements of antenna system 100 and/or the impedance of reader 106.

Matching circuit 108 may be any suitable matching circuit known in the art and may include a plurality of fixed-value and variable capacitors 110, as illustrated in FIG. 1. It is understood, however, that the variable capacitors may be obviated and conveniently replaced by fixed-value capacitors only, having capacitance values selected so as to provide the required matching of primary loop antenna 102 to reader 106 for a given application.

Primary loop antenna 102 preferably has a first end 112 and a second end 114, both of which first and second ends 112 and 114 are coupled to the reader 106 by way of the matching circuit 108. The connection of primary loop antenna 102 to reader 106 at both of its ends creates a current return path between primary loop antenna 102 and the reader 106, as a result of which current return path primary loop antenna 102 presents an inductive load to the reader 106.

Secondary loop antenna 104 is preferably tuned to the resonant frequency of the contactless transaction device with which antenna system 100 is operative to communicate. For contactless credit card applications at 13.56 MHz secondary loop antenna 104 is preferably tuned to resonate in a 12-20 MHz range, which frequency range corresponds to the typical resonant frequency range associated with contactless credit cards. By way of example, secondary loop antenna 104 may be tuned so as to resonant at 15.3 MHz.

It has been found that antenna system 100 operates optimally when the resonant frequency of secondary loop antenna 104 is somewhat offset from the 13.56 MHz resonant frequency of primary loop antenna 102. The preferable frequency separation between the respective resonant frequencies of primary and secondary loop antennas 102 and 104 has been experimentally found to be greater than 400 KHz. In the case that the resonant frequency of the secondary loop antenna 104 is set to be exactly equal to the 13.56 MHz resonant frequency of the primary loop antenna 102, a degradative effect is seen on the overall radiated power of antenna system 100.

Secondary loop antenna 104 is preferably tuned to the desired resonant frequency by way of inclusion of capacitors 116 in parallel or series with secondary loop antenna 104. It is understood, however, that the illustrated arrangement of capacitors 116 shown in FIG. 1 is exemplary only and that a greater or fewer number of capacitors located at a variety of points with respect to secondary loop antenna 104 may be included within secondary loop antenna 104 for the purpose of tuning secondary loop antenna 104.

It is particular feature of a preferred embodiment of the present invention that secondary loop antenna 104 is preferably galvanically connected to primary loop antenna 102 at a single connection point 118. This interconnection between primary and secondary loop antennas 102 and 104 has been found to improve the co-operation of primary and secondary loop antennas 102 and 104 and increase the radiative power of antenna system 100.

Furthermore, as shown in FIG. 1, galvanic connection point 118 additionally serves as a connection point between one end of secondary loop antenna 104 and reader 106. A second end 120 of secondary loop antenna 104 is preferably closed in on itself to form a closed loop, as shown in FIG. 1. Alternatively, second end 120 of secondary loop antenna 104 may be grounded.

The connection of secondary loop antenna 104 to reader 106 at only a single one of its ends prevents the establishment of a current return path between secondary loop antenna 104 and the reader 106. As a result, secondary loop antenna 104 does not present an inductive load to the reader. It is a particular feature of a preferred embodiment of the present invention that the presence of secondary loop antenna 104 in antenna system 100 serves to add loops to and thereby to increase the radiative power of antenna system 100 without presenting an inductive load to the reader 106. This is a highly advantageous feature of antenna system 100, since connecting secondary loop antenna 104 to reader 106 at both of its ends would affect the inductive load to the reader 106 and cause the reader output to be driven inefficiently. Furthermore, as a result of secondary loop antenna 104 not loading the reader 106, secondary loop antenna 104 causes only a negligible increase, if any, in the current drawn from the reader 106.

As will be readily appreciated by those skilled in the art, the greater the number of turns in each of primary and secondary loop antennas 102 and 104, the greater their radiative power and associated inductance. For contactless credit card applications at 13.56 MHz each of the primary and secondary loop antennas 102 and 104 preferably comprises three turns. However, it is appreciated that one or both of primary and secondary loop antennas 102 and 104 may be readily modified to include a greater or fewer number of turns depending on their desired respective operating frequencies.

Secondary loop antenna 104 is preferably positioned with respect to primary loop antenna 106 so as to make capacitive coupling therebetween negligible and prevent cancellation of current. For operation at EMVCo standards at 13.56 MHz, secondary loop antenna 104 is preferably offset from primary loop antenna 102 by a distance of at least 1.5 mm, although it is appreciated that this separation may be optimized according to the operating requirements of antenna system 100.

As clearly seen in FIG. 1, secondary loop antenna 104 is preferably located within and enclosed by primary loop antenna 102 so as to enhance their combined radiative power and provide a compact arrangement meeting the volume requirements of ISO/IEC 14443 as implemented in EMVCo CCPS. It is appreciated, however, that secondary loop antenna 104 is not limited to this location with respect to primary loop antenna 102 and may alternatively be positioned at a variety of other locations with respect to primary loop antenna 102, provided that capacitive coupling therebetween remains negligible.

Furthermore, it is appreciated that the antenna system of the present invention is not limited to the inclusion of only a single secondary loop antenna 104. Rather, the antenna system of the present invention may benefit from the inclusion of additional secondary loop antennas galvanically connected to primary loop antenna 102, such as additional secondary loop antenna 302 shown in antenna system 300 of FIG. 3. Additional secondary loop antenna 302 may be located adjacent to primary loop antenna 102, as in the illustrated embodiment shown in FIG. 3, or within primary loop antenna 102 as is the case for secondary loop antenna 104. Additional secondary loop antenna 302 may have the same or different number of turns as primary loop antenna 102.

In operation of antenna system 100, each of primary loop antenna 102 and secondary loop antenna 104 receives an RF signal from the signal driver (not shown) in the reader 106. The primary loop antenna 102 is well matched to the reader at 13.56 MHz as a result of the presence of matching circuit 108. The primary and secondary loop antennas 102 and 104 radiate RF power, which radiated RF power preferably powers up a contactless transaction device such as a contactless credit card. The presence of secondary loop antenna 104 advantageously serves to increase the radiated power of antenna system 100 by adding more loops thereto, without affecting the inductive load presented to the reader and therefore without significantly increasing the current drawn from the reader.

As a result of its increased RF power, ascribable to the general configuration of primary and secondary loop antennas 102 and 104 with respect to the reader 106 and in particular to the galvanic connection 118 provided between primary loop antenna 102 and secondary loop antenna 104, antenna system 100 is particularly well suited for use in challenging operating environments in which maximization of radiated RF power by the antenna system employed therein is highly desirable.

Figure 2A:
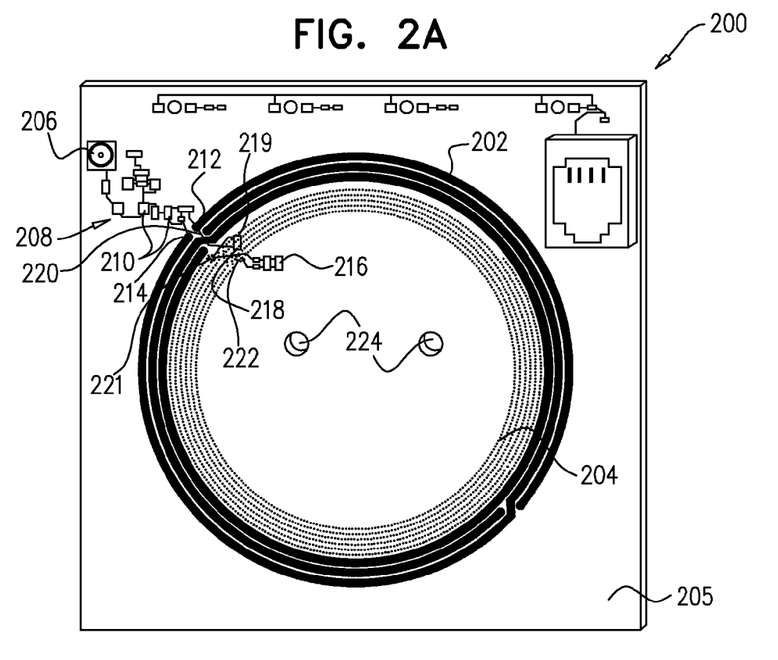
FIGS. 2A and 2B are simplified respective top and underside views of an antenna system generally corresponding to the circuit diagram of FIG. 1.
Figure 2B:
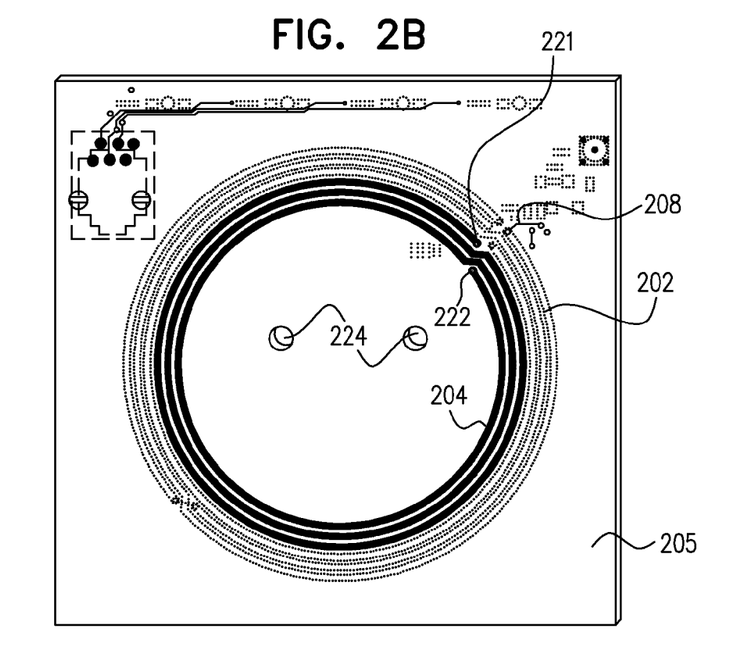

Reference is now made to FIGS. 2A and 2B, which are simplified respective top and underside views of an antenna system generally corresponding to the circuit diagram of FIG. 1.

As seen in FIGS. 2A and 2B, there is provided an antenna system 200 preferably including a primary loop antenna 202, as seen most clearly in FIG. 2A, and a secondary loop antenna 204, as seen most clearly in FIG. 2B. Primary loop antenna 202 and secondary loop antenna 204 are preferably respectively formed on upper and lower surfaces of a dielectric substrate such as a printed circuit board (PCB) substrate 205. It is appreciated, however, that primary and second loops 202 and 204 may alternatively be located on a common surface of PCB 205.

Primary and secondary loop antennas 202 and 204 are preferably planar copper loops having circular ring-like configurations. It is appreciated, however, that primary and secondary loop antennas 202 and 204 may alternatively be configured in a variety of appropriate configurations, including square or rectangular loops lying in a single or in multiple planes.

Antenna system 200 further includes a reader (not shown), to which reader primary and secondary loop antennas 202 and 204 are preferably coupled by way of a coaxial cable connection 206. It is appreciated that in the case where matching to a 50 Ohm impedance of the reader is not required, coaxial cable connection 206 may alternatively be obviated.

Antenna system 200 is preferably adapted for use with contactless transaction devices. Particularly preferably, antenna system 200 is operative to meet EMVCo Contactless Level 1 Requirements at 13.56 MHz for communication with contactless credit cards when antenna system 200 is installed in a contactless transaction terminal such as a vending machine.

The impedance of primary loop antenna 202 is preferably matched to the impedance of the reader by way of a matching circuit 208. For contactless credit card applications at 13.56 MHz, primary loop antenna 202 is preferably tuned together with matching circuit 208 to resonate at 13.56 MHz at a 50 Ohm impedance provided by coaxial cable 206. It is appreciated, however, that primary loop antenna 202 may be matched to the reader at a variety of operating frequencies and input impedances, depending on the operating requirements of antenna system 200 and/or the impedance of the reader.

Matching circuit 208 may be any suitable matching circuit known in the art and may include a multiplicity of capacitors 210 having capacitance values selected so as to provide the required matching of primary loop antenna 202 to the reader by way of coaxial cable 206.

Primary loop antenna 202 preferably has a first end 212 and a second end 214, both of which first and second ends 212 and 214 are coupled to the reader by way of the matching circuit 208. The connection of primary loop antenna 202 to the reader at both of its ends creates a current return path between primary loop antenna 202 and the reader, as a result of which current return path primary loop antenna 202 presents an inductive load to the reader.

Secondary loop antenna 204 is preferably tuned to the resonant frequency of the contactless transaction device with which antenna system 200 is operative to communicate. For contactless credit card applications at 13.56 MHz secondary loop antenna 204 is preferably tuned to resonate in 12-20 MHz range, which frequency range corresponds to the typical resonant frequency range associated with contactless credit cards. By way of example, secondary loop antenna 204 may be tuned so as to resonant at 15.3 MHz.

It has been found that antenna system 200 operates optimally when the resonant frequency of secondary loop antenna 204 is somewhat offset from the 13.56 MHz resonant frequency of primary loop antenna 202. The preferable frequency separation between the respective resonant frequencies of primary and secondary loop antennas 202 and 204 has been experimentally found to be greater than 400 kHz. In the case that the resonant frequency of the secondary loop antenna 204 is set to be exactly equal to the 13.56 MHz resonant frequency of the primary loop antenna 202, a degradative effect is seen on the overall radiated power of antenna system 200.

Secondary loop antenna 204 is preferably tuned to the desired resonant frequency by way of inclusion of capacitors 216 within secondary loop antenna 204. It is understood, however, that the illustrated arrangement of capacitors 216 shown in FIG. 2A is exemplary only and that a greater or fewer number of capacitors located at a variety of points with respect to secondary loop antenna 204 may be included in secondary loop antenna 204 for the purposes of tuning secondary loop antenna 204.

It is particular feature of a preferred embodiment of the present invention that secondary loop antenna 204 is preferably galvanically connected to primary loop antenna 202 at a single connection point 218. In the embodiment of the invention illustrated in FIGS. 2A and 2B, galvanic connection point 218 comprises a resistor network 219 and a copper trace 220, best seen in FIG. 2A. This inter-connection between primary and secondary loop antennas 202 and 204 has been found to improve the co-operation of primary and secondary loop antennas 202 and 204 and thereby to increase the radiative power of antenna system 200.

Secondary loop antenna 204 preferably includes a first end 221 and a second end 222. Second end 222 of secondary loop antenna 204 is preferably closed in on itself to form a closed loop via tuning capacitors 216.

The connection of secondary loop antenna 204 to the reader at only a single one of its ends prevents the establishment of a current return path between secondary loop antenna 204 and the reader. As a result, secondary loop antenna 204 does not present an inductive load to the reader. It is a particular feature of a preferred embodiment of the present invention that the presence of secondary loop antenna 204 in antenna system 200 serves to add loops to and thereby to increase the radiative power of antenna system 200 without presenting an inductive load to the reader. This is a highly advantageous feature of antenna system 200, since connecting secondary loop antenna 204 to the reader at both of its ends would affect the inductive load to the reader and cause the reader output to be driven inefficiently. Furthermore, as a result of secondary loop antenna 204 not loading the reader, secondary loop antenna 204 causes only a negligible increase, if any, in the current drawn from the reader 206 in comparison to the current drawn in the absence of secondary loop antenna 204.

As will be readily appreciated by those skilled in the art, the greater the number of turns in each of primary and secondary loop antennas 202 and 204, the greater their radiative power and associated inductance. For contactless credit card applications at 13.56 MHz each of the primary and secondary loop antennas 202 and 204 preferably comprises three turns. However, it is appreciated that one or both of primary and secondary loop antennas 202 and 204 may be readily modified to include a greater or fewer number of turns depending on their desired operating frequencies.

Secondary loop antenna 204 is preferably positioned with respect to primary loop antenna 206 so make capacitive coupling therebetween negligible and prevent cancellation of current therebetween. For operation at EMVCo standards at 13.56 MHz secondary loop antenna 204 is preferably offset from primary loop antenna 202 by a distance of at least 1.5 mm, although it is appreciated that this separation may be optimized according to the operating requirements of antenna system 200.

As clearly seen in FIG. 2B, secondary loop antenna 204 is preferably located within and enclosed by primary loop antenna 202 so as to enhance their combined radiative power and provide a compact arrangement meeting the volume requirements of ISO/IEC 14443 as implemented in EMVCo CCPS. It is appreciated, however, that secondary loop antenna 204 is not limited to this location with respect to primary loop antenna 202 and may alternatively be positioned at a variety of other locations with respect to primary loop antenna 202, provided that capacitive coupling therebetween remains negligible.

A pair of fixing holes 224 may optionally be formed in PCB 205 for the purpose of installing PCB 205 in a contactless transaction terminal, as will be detailed with reference to FIG. 4 below.

In operation of antenna system 200, each one of the primary loop antenna 202 and secondary loop antenna 204 receives an RF signal from the signal driver in the reader. The primary loop antenna 202 is well matched to the reader at 13.56 MHz as a result of the presence of matching circuit 208. The primary and secondary loop antennas 202 and 204 radiate RF power, which radiated RF power preferably powers up a contactless transaction device such as a contactless credit card. The presence of secondary loop antenna 204 advantageously serves to increase the radiated power of antenna system 200 by adding more loops thereto, without affecting the inductive load presented to the reader and therefore without significantly increasing the current drawn by the reader.

As a result of its increased RF power, ascribable to the general configuration of primary and secondary loop antennas 202 and 204 with respect to the reader and in particular to the galvanic connection 218 provided between primary loop antenna 202 and secondary loop antenna 204, antenna 200 is particularly well suited for use in challenging operating environments in which maximization of radiated RF power by the antenna system employed therein is highly desirable.

Figure 3:
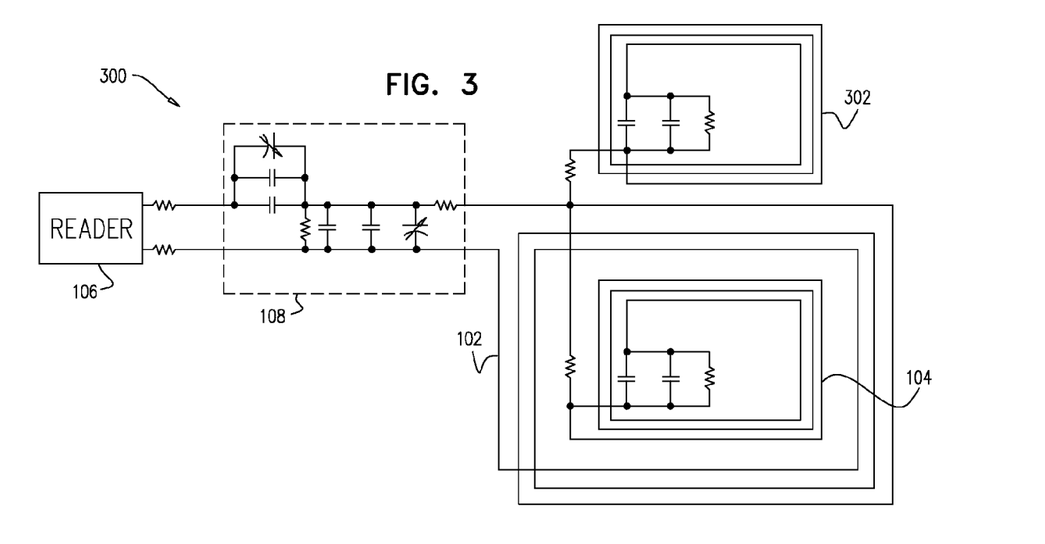
FIG. 3 is a simplified circuit diagram of an antenna system constructed and operative in accordance with another preferred embodiment of the present invention.
Figure 4:
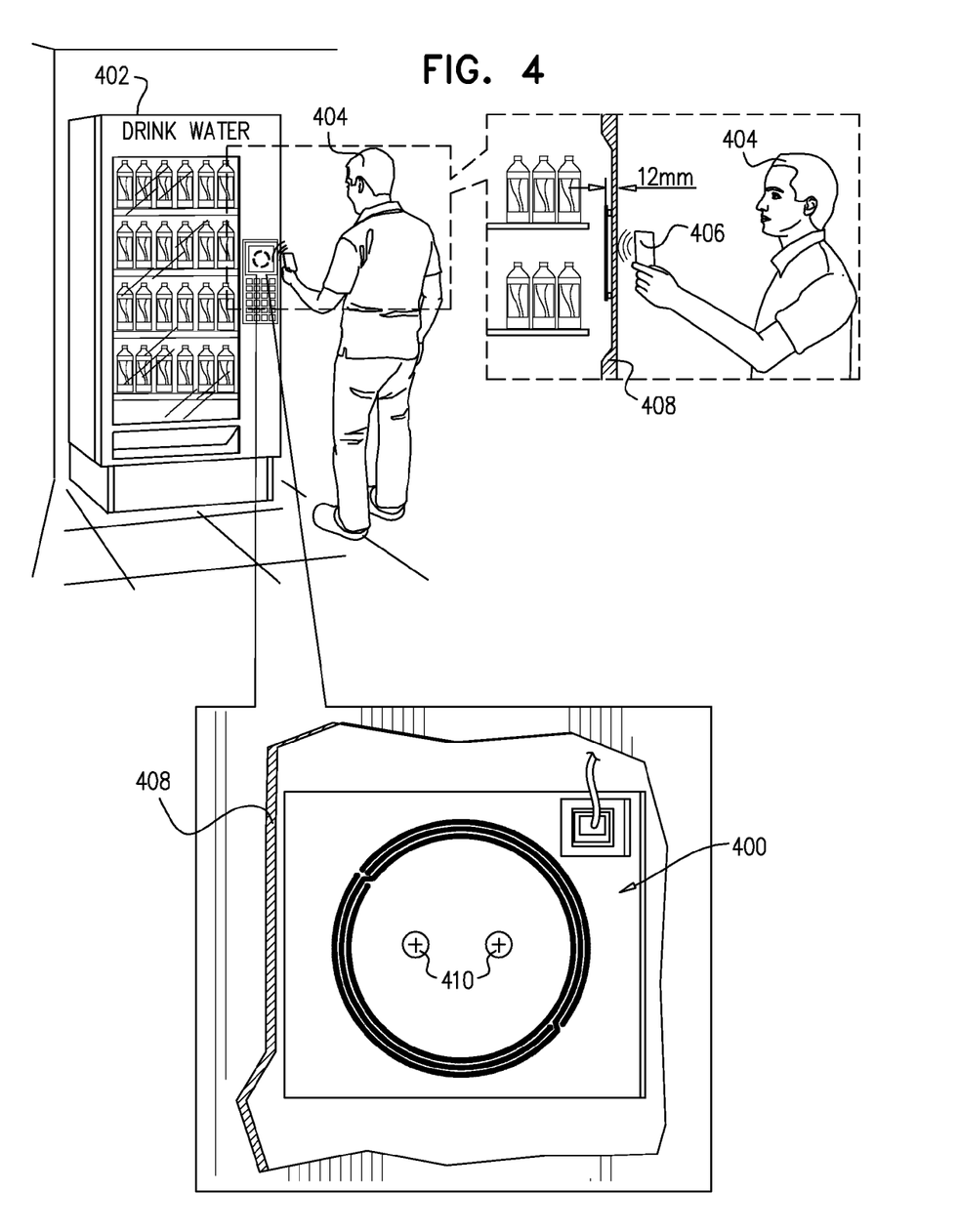
FIG. 4 is a simplified partially-pictorial, partially-sectional illustration of an antenna system of any of the types shown in FIGS. 1-3, in the context of a contactless transaction terminal.

Reference is now made to FIG. 4 which is a simplified partially-pictorial, partially-sectional illustration of an antenna system of any of the types illustrated in FIGS. 1-3 in the context of a contactless transaction terminal.

As seen in FIG. 4, an antenna system 400, a simplified portion of which is shown, is preferably installed in a contactless transaction terminal, here embodied, by way of example as a vending machine 402. Antenna system may correspond to a preferred embodiment of any one of the above-described antenna systems 100, 200, 300. A user 404 bearing a contactless transaction device, such as a contactless credit card 406, is shown standing in proximity to the vending machine 402. Antenna system 400 is preferably operative to communicate with contactless credit card 406 such that user 404 may use contactless credit card 406 to carry out a transaction at vending machine 402.

Vending machine 402 is an unattended vending machine and therefore includes a metallic outer layer 408 for the purposes of robustness and security. Antenna system 400 is preferably installed behind metallic outer layer 408 and may be secured by way of screws 410. Metallic outer layer 408 absorbs RF power emitted by antenna system 400 and thus degrades the performance of antenna system 400. The presence of metallic outer layer 408 would prevent antenna system 400 meeting EMVCo contactless level 1 requirements when in operation, but for the enhanced RF power radiated by antenna 400 due to the unique configuration of its primary and secondary loop antennas and the galvanic connection therebetween, as has been detailed above with reference to antenna systems 100-300.

Antenna system 400 is typically separated from metallic outer layer 408 by a distance of approximately 12 mm when installed in vending machine 402. However, it is appreciated that antenna system 400 may be located at greater or smaller distances from outer metallic layer 408 in a contactless transaction terminal depending on the particular application and terminal structure.

It is appreciated that the installation of antenna system 400 in a vending machine is exemplary only and that antenna system 400 is well-suited for installation in a variety of other contactless transaction terminals adapted for cooperation with contactless transaction devices.

It is further appreciated that antenna 100 is suitable for use with a wide variety of near field communication devices other than contactless credit cards, including key fobs and mobile phones.

It is further understood that although the respective operations of antenna systems 100-400 are described above with reference to the antenna systems working in a transmit mode, one skilled in the art will readily understand that the same description, modified as is well known in the art, may be applied to antenna systems 100-400 working in a receive mode.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. An antenna system suitable for use with contactless transaction devices, said antenna system comprising:
   a reader;
   a primary loop antenna having a first end and a second end, each one of said first and second ends being coupled to said reader such that there is a current return path between said primary loop antenna and said reader whereby said primary loop antenna presents an inductive load to said reader; and
   at least one secondary loop antenna galvanically connected to said primary loop antenna at a single connection point,
   said at least one secondary loop antenna being coupled to said reader at only a single one of its ends, such that establishment of a current path return between said secondary loop antenna and said reader is prevented, whereby said at least one secondary loop antenna does not present an inductive load to said reader, and said connection point between said secondary loop antenna and said primary loop antenna additionally serving as a connection point between said single end of said secondary loop antenna and said reader, wherein said secondary loop is closed on itself to form a closed loop.

2. An antenna system according to claim 1, wherein said at least one secondary loop antenna comprises a single secondary loop antenna.

3. An antenna system according to claim 1, wherein said first and second ends of said primary loop antenna are connected to a matching circuit, said matching circuit being operative to match an impedance of said primary loop antenna to an impedance of said reader.

4. An antenna system according to claim 1, wherein said primary loop antenna comprises three turns.

5. An antenna system according to claim 4, wherein said secondary loop antenna comprises three turns.

6. An antenna system according to claim 1, wherein said primary loop antenna has a resonant frequency of 13.56 MHz.

7. An antenna system according to claim 6, wherein said secondary loop antenna has a resonant frequency in a range of 12-20 MHz.

8. An antenna system according to claim 7, wherein said resonant frequency of said primary loop antenna is offset from said resonant frequency of said secondary loop antenna by at least 400 kHz.

9. An antenna system according to claim 1, wherein said secondary loop antenna comprises a capacitor for tuning said secondary loop antenna.

10. An antenna system according to claim 1, wherein said primary loop antenna is separated from said secondary loop antenna by a distance of at least 1.5 mm.

11. An antenna system according to claim 1, wherein said secondary loop antenna is located within and enclosed by said primary loop antenna.

12. An antenna system according to claim 1, wherein said primary loop antenna and said secondary loop antenna are formed on a printed circuit board.

13. An antenna system according to claim 12, wherein said primary loop antenna is formed on an upper surface of said printed circuit board and said secondary loop antenna is formed on a lower surface of said printed circuit board.

14. An antenna system according to claim 12, wherein said primary loop antenna and said secondary loop antenna are formed on a common surface of said printed circuit board.

15. An antenna system according to claim 1, wherein said primary loop antenna is coupled to said reader by way of a coaxial cable.

16. An antenna system according to claim 1, wherein said contactless transaction device comprises a near field communication device.

17. An antenna system according to claim 1, wherein said contactless transaction device comprises a contactless credit card.

* * * * *